(No Model.) H. B. ROBISCHUNG. 2 Sheets—Sheet 1.
BRAKE BEAM.
No. 485,823. Patented Nov. 8, 1892.
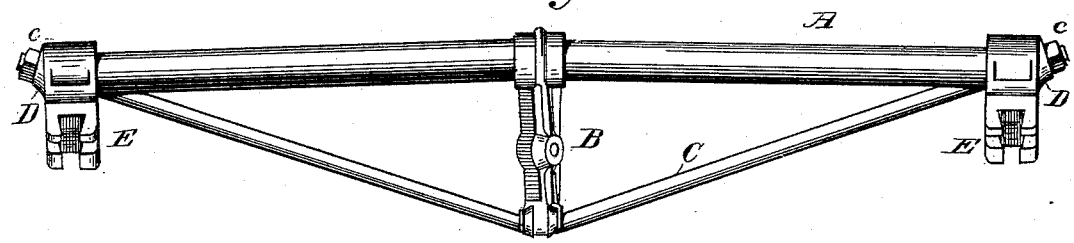
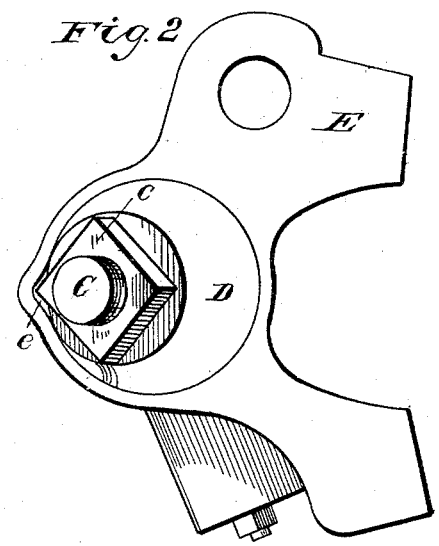
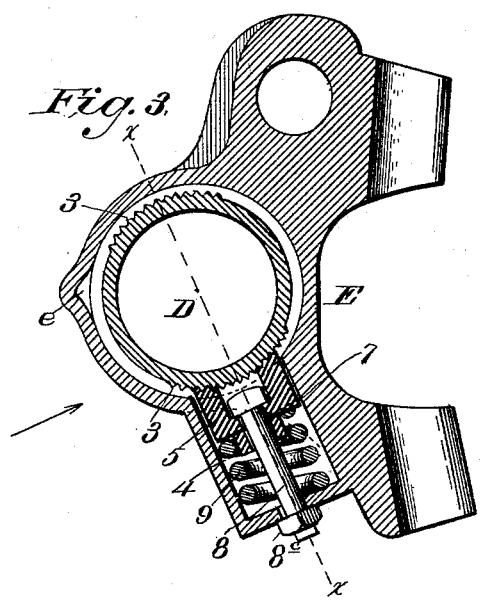
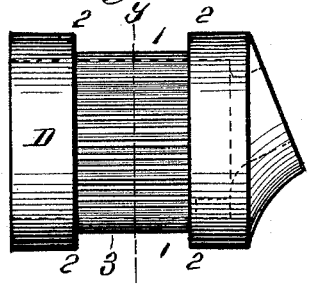
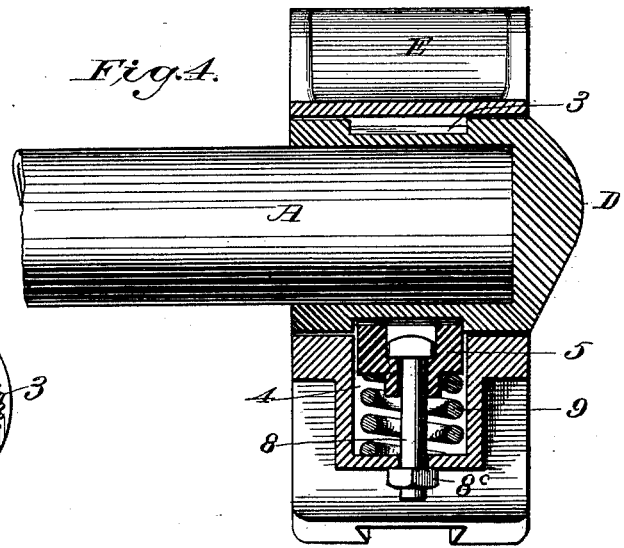
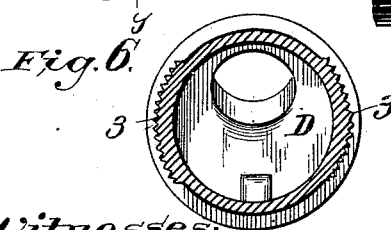
Witnesses:
F. P. Cornwall
B. H. Naylor
Inventor
Henry B. Robischung
by F. W. Ritter Jr

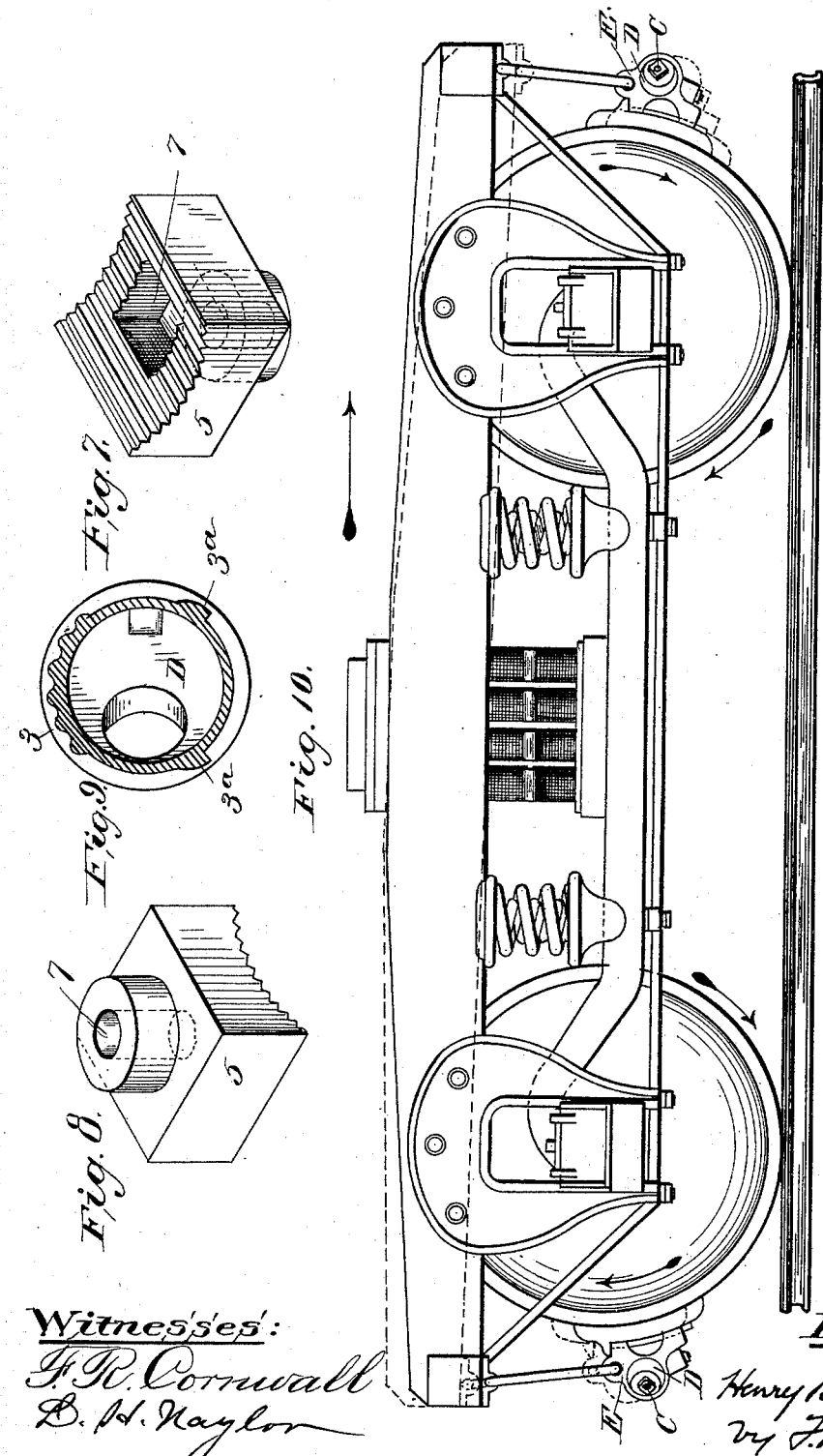

UNITED STATES PATENT OFFICE.

HENRY B. ROBISCHUNG, OF KALAMAZOO, MICHIGAN.

BRAKE-BEAM.

SPECIFICATION forming part of Letters Patent No. 485,823, dated November 8, 1892.

Application filed November 20, 1891. Serial No. 412,588. (No model.)

*To all whom it may concern:*

Be it known that I, HENRY B. ROBISCHUNG, a citizen of the United States, residing at Kalamazoo, in the county of Kalamazoo and State of Michigan, have invented certain new and useful Improvements in Brake-Beams; and I hereby declare the following to be a full, clear, and exact description of the same, reference being had to the accompanying drawings, in which—

Figure 1 is a plan view of a brake-beam embodying my invention. Fig. 2 is an elevation of the brake-head with an end view of the sleeve. Fig. 3 is a vertical central section of the head. Fig. 4 is a sectional view of the head and sleeve, taken at the line $x\,x$, Fig. 3, looking in the direction of the arrow. Fig. 5 is a detached view of the sleeve. Fig. 6 is a transverse section of the sleeve on the line $y\,y$, Fig. 5. Figs. 7 and 8 are perspective views of the retaining device. Fig. 9 is a transverse section of a modified form of sleeve; and Fig. 10 is a side elevation of a passenger-car truck with the brake-heads shown in full lines in the normal position, and the dotted lines showing the positions the heads, beams, and truck will assume when the brakes are applied.

Like symbols refer to like parts wherever they occur.

Whenever brakes as now constructed are applied to retard or arrest the motion of a train, the rotation of the wheels has a tendency to pull down one brake-beam and force up the other, with a consequent tilting of the truck, change of relation of the beams to the line of draft or applied power, and change of head with relation to the wheel, as indicated in Fig. 10, and, furthermore, the tilting of the truck and hang of the beams and brake-heads are reversed whenever the direction of motion of the train is reversed and the brakes thereafter applied. In case of rigidly-attached brake-heads the wear and strain are irregular and injurious to the devices. To meet these changing conditions, various expedients have been resorted to for the purpose of holding a loosely-mounted shoe in proper position with relation to the wheel, to permit it to automatically adjust itself to the wheel, and to prevent it from overtipping when the brakes are off— as, for instance, the head has been loosely journaled, or the beam provided with lugs or stops which limit its rotation thereon, and with a spring or springs to restore the head to its normal position when the brakes were released. Experience, however, has shown that while it is desirable that the head should be capable of adjusting itself to the wheel, yet it is equally (if not more) important that the head should be positively held in its proper position after it has assumed said position, and should also be capable of being forced into a different position whenever cause arises to change the relation of the wheel and head.

The object of my present invention, therefore, is to effect such a combination of beam and brake-head that the head shall be automatically adjustable on the beam and positively locked thereon after adjustment.

To this end my invention, generally stated, consists, mainly, in the combination, with a brake-beam and a movable brake-head preferably journaled thereon, of a yielding lock which secures the head to the beam until overcome by undue force, and, secondarily, in certain combinations, and, finally, in particular details of construction, all as will hereinafter more fully appear.

I will now proceed to describe my invention more fully, so that others skilled in the art to which it appertains may apply the same.

For purposes of illustration a cambered trussed brake-beam has been chosen, because the invention is particularly valuable therein, and also because the mechanical features of the invention in its entirety is best illustrated thereon; but I do not intend to limit my invention to that particular class of structure, as the broad features of the invention can be readily applied to various well-known forms of beam.

In the drawings, A is the compression member or beam proper; B, the strut or post; C, the tension-rod; D, sleeves or caps inclosing the ends of the beams, and through which pass the ends of the tension-rods, and E the brake-heads.

The combination of parts as above specified are not herein claimed, and may find their equivalents in any beam, and also for the purposes of this description and invention the sleeve or caps D D and end of the beam A may be considered as integral, and any features of construction hereinafter specified as belonging to said sleeve D may be considered as equally applicable to the end of the beam where other than trussed beams are employed. In the sleeves D, (or on the end of the beam if sleeves are not used,) I form a circumferential groove 1, preferably with square shoulders, as at 2, and with its bottom corrugated at one or more points, as at 3, to form a slip-grip for a suitable locking block or bolt. The corrugations 3 of the groove are shown as occupying opposite quarter-sections of the periphery to enable the reversal of the head on the beam when desired; but it is evident that the bottom of the groove 1 may be corrugated throughout, if desired; or, if preferred, the groove may be plain and provided with stops, as shown at $3^a$, Fig. 9, to limit the rotation of the head. The groove, with its square shoulders, not only serves as a guide for the locking-block, but, in conjunction with the locking-block, prevents the endwise movement of the head E and its displacement or escape from the beam. The brake-head E may be of any desired pattern adapted to receive any of the known forms of brake-shoe, and is formed with an opening adapted to receive journal on the end of the beam A or the sleeve D, which constitutes the journal, and with a pocket or housing 4 for a yielding locking-block 5.

5 indicates a suitable locking-block or bolt adapted to slide in the housing 4, having a concave face 6, corrugated or otherwise formed, so as to engage with the corrugations 3 or slip-grip on the sleeve or journal D. This locking-block or grip-bolt 5 is preferably perforated, as at 7, for the passage of a bolt 8, the head of the bolt being countersunk in the grip-bolt and its opposite end projecting from the head and provided with a nut $8^c$, and said grip-bolt or locking-block may be spring-supported and projected, said spring being preferably a spiral spring 9, which encircles the bolt and is sufficiently strong to positively lock the head on the beam unless very considerable force is exerted on the head. By screwing down the nut $8^c$ the locking-block 5 may be drawn into the housing sufficiently to permit the application of the head to the beam or its removal therefrom.

In case a trussed beam of the general character shown is employed, as the head is applied after the beam is set up, it will be necessary in some constructions to form the head with a notch, as at $e$, to permit the passage of the nut $c$ of the tension-rod C, and generally the skill of the mechanic may be called into service to adapt the head to the particular form of beam with which it is to be used.

The sleeve D (or end of the beam) and head E being constructed substantially as hereinbefore specified, the head is applied to the beam by first tightening the nut $8^c$ to draw the locking-block or grip-bolt 5 flush with the walls of the beam-orifice in the head, after which the head is slipped on its journal and the nut $8^c$ loosened to permit the locking-block 5 to enter the groove 1 and engage the corrugations or lugs on the bottom thereof, whereupon the grip-bolt will not only lock the head against rotation by tipping, gravity, or casual moderate force, but will prevent the withdrawal of the head endwise from the beam. When, however, the brakes are applied, the frictional force of the wheels on the head will be sufficient to overcome the grip-bolt or locking-block and cause the brake-head to assume its proper position, whereupon the grip-bolt or locking-block will again lock the shoe and retain it in said position when the brakes are off and until from reversal of the motion of the wheels or from other cause sufficient force is again put on the heads to overcome the grip of the locking-block, whereupon the brake-head will automatically readjust itself to the new requirements and be at once locked in its new position by the locking-block 5.

Having thus described my invention, what I claim, and desire to secure by Letters Patent, is—

1. The combination, with a brake-beam, of a movable brake-head and an automatically-yielding locking-block or bolt for preventing the tipping or gravitation of the head on the beam, substantially as and for the purposes specified.

2. The combination, with a brake-beam having journaled ends, of a brake-head having a spring-supported grip or locking-block, substantially as and for the purposes specified.

3. The combination, with a brake-beam having a journal provided with projections, of a brake-head provided with a spring-supported grip or locking-block, substantially as and for the purposes specified.

4. The combination, with a brake-beam having a corrugated journal, of a brake-head provided with a spring-supported corrugated-faced grip or locking-block, substantially as and for the purposes specified.

5. The combination, with a brake-beam having journaled ends, of a brake-head having a housing for the reception of a locking-block, a yielding locking-block arranged in said housing, and means for preventing the lateral displacement of the brake-head, substantially as and for the purposes specified.

6. The combination, with a brake-beam having a journal provided with limit lugs or stops, of a brake-head having a housing for a locking-block and a spring-supported locking-block arranged in said housing, substantially as and for the purposes specified.

7. The combination, with a brake-beam, of a brake-head having a housing for a grip-bolt or locking-block, a locking-block arranged in said housing, and a spring for supporting and projecting said locking-block, substantially as and for the purposes specified.

8. The combination, with a brake-beam, of a brake-head having a housing for a grip-bolt or locking-block, a locking-block arranged in said housing, a spring for supporting and projecting said locking-block, and a bolt which passes through the head, substantially as and for the purposes specified.

9. The combination, with a brake-beam having a groove for the reception of a locking-block, of a brake-head provided with an automatically-yielding locking-block, substantially as and for the purposes specified.

10. The combination, with a brake-head provided with a housing for the reception of a grip-bolt or locking-block, of a yielding grip-bolt or locking-block arranged in the housing of the head, substantially as and for the purposes specified.

In testimony whereof I affix my signature in presence of two witnesses this 13th day of November, 1891.

HENRY B. ROBISCHUNG.

Witnesses:
E. B. LEIGH,
E. T. WALKER.